United States Patent
Peterson et al.

(10) Patent No.: US 11,333,281 B1
(45) Date of Patent: May 17, 2022

(54) HOSE FITTING AND HOSE ASSEMBLY FOR MARINE VEHICLES

(71) Applicant: Brunswick Corporation, Mettawa, IL (US)

(72) Inventors: Jody A. Peterson, Oshkosh, WI (US); Peter P. Grinwald, Rubicon, WI (US); Michael A. Torgerud, Mount Calvary, WI (US); Robert W. Egleston, Stillwater, OK (US)

(73) Assignee: Brunswick Corporation, Mettawa, IL (US)

(*) Notice: Subject to any disclaimer, the term of this patent is extended or adjusted under 35 U.S.C. 154(b) by 185 days.

(21) Appl. No.: 16/713,159

(22) Filed: Dec. 13, 2019

(51) Int. Cl.
*F16L 33/22* (2006.01)

(52) U.S. Cl.
CPC ....... *F16L 33/225* (2013.01); *Y10T 29/49826* (2015.01)

(58) Field of Classification Search
CPC ......... F16L 33/225; F16L 33/01; F16L 33/30; F16L 33/2071
USPC ...................................................... 285/242
See application file for complete search history.

(56) References Cited

U.S. PATENT DOCUMENTS

| | | |
|---|---|---|
| 2,464,416 A | 3/1949 | Raybould |
| 4,589,851 A | 5/1986 | Karls |
| 4,872,531 A | 10/1989 | Meisenburg et al. |
| 5,127,157 A | 7/1992 | Oetiker |
| 5,297,337 A | 3/1994 | Igarashi et al. |
| 5,387,016 A | 2/1995 | Joseph et al. |
| 5,505,643 A | 4/1996 | Prasse |
| 5,980,342 A | 11/1999 | Logan et al. |
| 6,010,162 A * | 1/2000 | Grau |
| 6,089,934 A | 7/2000 | Biggs et al. |
| 6,460,897 B1 * | 10/2002 | Manuli |
| 6,565,398 B1 | 5/2003 | Walczak |
| 6,718,953 B1 | 4/2004 | Torgerud |
| 7,101,239 B1 | 9/2006 | Torgerud et al. |
| 7,395,814 B1 | 7/2008 | Doepke et al. |
| 7,832,380 B1 | 11/2010 | Abou Zeid et al. |
| 8,342,578 B2 * | 1/2013 | Bobenhausen ..... F16L 33/2071 |
| 8,590,493 B1 | 11/2013 | Torgerud et al. |
| 8,770,630 B2 | 7/2014 | Zakrzewski et al. |
| 9,017,121 B1 | 4/2015 | Amerling |
| 9,458,808 B1 | 10/2016 | Torgerud |
| 9,644,514 B1 | 5/2017 | Langenfeld et al. |
| 10,018,165 B1 | 7/2018 | Torgerud et al. |
| 10,047,661 B1 | 8/2018 | Torgerud |
| 10,247,150 B1 | 4/2019 | Koplitz et al. |

(Continued)

FOREIGN PATENT DOCUMENTS

JP 5248873 8/2009

*Primary Examiner* — Zachary T Dragicevich
(74) *Attorney, Agent, or Firm* — Andrus Intellectual Property Law, LLP

(57) ABSTRACT

A hose fitting is provided to fluidly couple a hose to a component of a boat engine. The hose fitting includes a lead in portion having a substantially smooth exterior surface, a barbed portion with multiple barbs configured to sealingly engage with an inner liner of the hose, a grip portion with multiple substantially flat grip faces; and a terminating portion configured to couple to the component of the boat engine. The lead in portion, the barbed portion, the grip portion, and the terminating portion collectively define a central flow passage extending through the hose fitting.

9 Claims, 5 Drawing Sheets

(56) References Cited

U.S. PATENT DOCUMENTS

| | | |
|---|---|---|
| 10,293,910 B1 | 5/2019 | Torgerud et al. |
| 2004/0020545 A1 | 2/2004 | Takagi et al. |
| 2004/0032124 A1* | 2/2004 | Lefere .................. F16L 33/2071 285/242 |
| 2012/0292900 A1* | 11/2012 | Bobenhausen ..... F16L 33/2071 |
| 2013/0280970 A1 | 10/2013 | Clarkson et al. |
| 2015/0130184 A1 | 5/2015 | Filipczak |
| 2019/0151927 A1* | 5/2019 | Lidgett ................... F16L 33/30 |

* cited by examiner

HOSE FITTING AND HOSE ASSEMBLY FOR MARINE VEHICLES

FIELD

The present disclosure relates to marine vessels and watercraft, and more particularly, to a hose fitting used in a high pressure oil hose assembly for marine vessel and watercraft engines.

BACKGROUND

U.S. Pat. No. 4,589,851 discloses a flushing device that is provided to supply water to an inlet provided on the bottom of the anti-ventilation plate of an outboard motor. The flushing device uses a mounting bracket to hold a resilient cup compressed in place over the water inlet. A hose connector allows the cup to be connected to a water supply.

U.S. Pat. No. 5,387,016 discloses a connector for joining together a pair of fluid carrying hose members in an automotive vehicle. The connector includes a tubular body having a first end, a second end, and a shoulder interposed therebetween, the first end including a plurality of angled barbs projecting from an outer surface thereof. The connector also includes a tubular liner press-fit into the first end of the body and a generally cylindrical, cup-shaped collar surrounding the outer surface of the first end of the body. A roll formed beadlock is formed against an interior surface of the collar to prevent axial displacement of the collar along the body of the connector.

U.S. Pat. No. 9,017,121 discloses an outboard marine drive that includes an upper powerhead having an engine, a downwardly depending driveshaft housing, and a lower gearcase having a propulsor for propelling a marine vessel. The engine has a removable oil filter for filtering lubricating oil for the engine, and a drip tray at the interface of the oil filter and the engine for collecting residual oil upon removal of the oil filter. The driveshaft housing has an oil sump below the engine and providing a reservoir for the lubricating oil. The oil sump has a drain fitting for draining oil therefrom. A connection hose extends from the drip tray downwardly to the oil sump drain fitting for delivering residual oil from the drip tray to the oil sump drain fitting and/or a valve.

U.S. Patent Application Publication No. 2015/0130184 discloses a barbed hose end fitting apparatus for a PTFE core hose sealing that couples a PTFE core hose to a fluid component. The fitting apparatus includes a fitting carrying a first barb for sealing insertion of one end of a PTFE hose forced over the first barb. An opposite end of the fitting includes threads to couple the fitting to another fluid component. A gripping surface formed of hex flats can be disposed intermediate between the ends of the body to facilitate coupling and uncoupling of the fitting to another component.

Japanese Patent No. 5,248,873 discloses a resin nipple used for a hose fitting and a hose fitting connection structure, for example, a kitchen sink or a washbasin faucet, a toilet water tank, and other flexible hoses for water supply and hot water supply. The patent further discloses a resin nipple for a fitting that is used after being crimped, and a connection structure between a hose fitting having the nipple and a hose.

Each of the above patents and publications is hereby incorporated herein by reference in its entirety.

SUMMARY

This Summary is provided to introduce a selection of concepts that are further described herein below in the Detailed Description. This Summary is not intended to identify key or essential features of the claimed subject matter, nor is it intended to be used as an aid in limiting the scope of the claimed subject matter.

According to one example of the present disclosure, a hose fitting is utilized to fluidly couple a hose to a component of a boat engine. The hose fitting includes a lead in portion having a substantially smooth exterior surface, a barbed portion with multiple barbs configured to sealingly engage with an inner liner of the hose, a grip portion with multiple substantially flat grip faces; and a terminating portion configured to couple to the component of the boat engine. The lead in portion, the barbed portion, the grip portion, and the terminating portion collectively define a central flow passage extending through the hose fitting.

According to another example of the present disclosure, a hose assembly is utilized to fluidly couple an oil pump to an oil filter in a boat engine. The hose assembly includes a hose that extends from a first end to a second end and has an inner liner fabricated from woven PTFE. The hose assembly further includes a first hose fitting situated at the first end and a second hose fitting situated at the second end. Each hose fitting includes a lead in portion having a substantially smooth exterior surface, a barbed portion with multiple barbs configured to sealingly engage with an inner liner of the hose, a grip portion with multiple flat grip faces, and a terminating portion configured to couple to the oil pump or the oil filter. The lead in portion, the barbed portion, the grip portion, and the terminating portion collectively define a central flow passage extending through each hose fitting. Each hose fitting is coupled to the hose with a first clamp and a second clamp.

According to a further example of the present disclosure, a method of assembling a hose assembly used to fluidly couple an oil pump to an oil filter in a boat engine is provided. The method includes providing a hose extending from a first end to a second end. The hose includes an inner liner coupled to an overbraid. The method further includes positioning a first hose clamp and a second hose clamp over the overbraid, and inserting a hose fitting into the first end of the hose. The hose fitting includes a lead-in portion having a substantially smooth exterior surface, a barbed portion with multiple barbs configured to sealingly engage with the inner liner of the hose, a knurled portion configured to inhibit rotation of the hose relative to the hose fitting, a grip portion with multiple substantially flat grip faces, and a terminating portion configured to couple to the oil pump or the oil filter. The method further includes securing the first hose clamp such that the first hose clamp spans a first section of the hose fitting including the barbed portion, and securing the second hose clamp such that the second hose clamp spans a second section of the hose fitting including the barbed portion and the knurled portion.

BRIEF DESCRIPTION OF THE DRAWINGS

The present disclosure is described with reference to the following Figures. The same numbers are used throughout the Figures to reference like features and like components.

DETAILED DESCRIPTION

In the present description, certain terms have been used for brevity, clearness and understanding. No unnecessary limitations are to be inferred therefrom beyond the requirement of the prior art because such terms are used for descriptive purposes only and are intended to be broadly construed.

Figure 1:
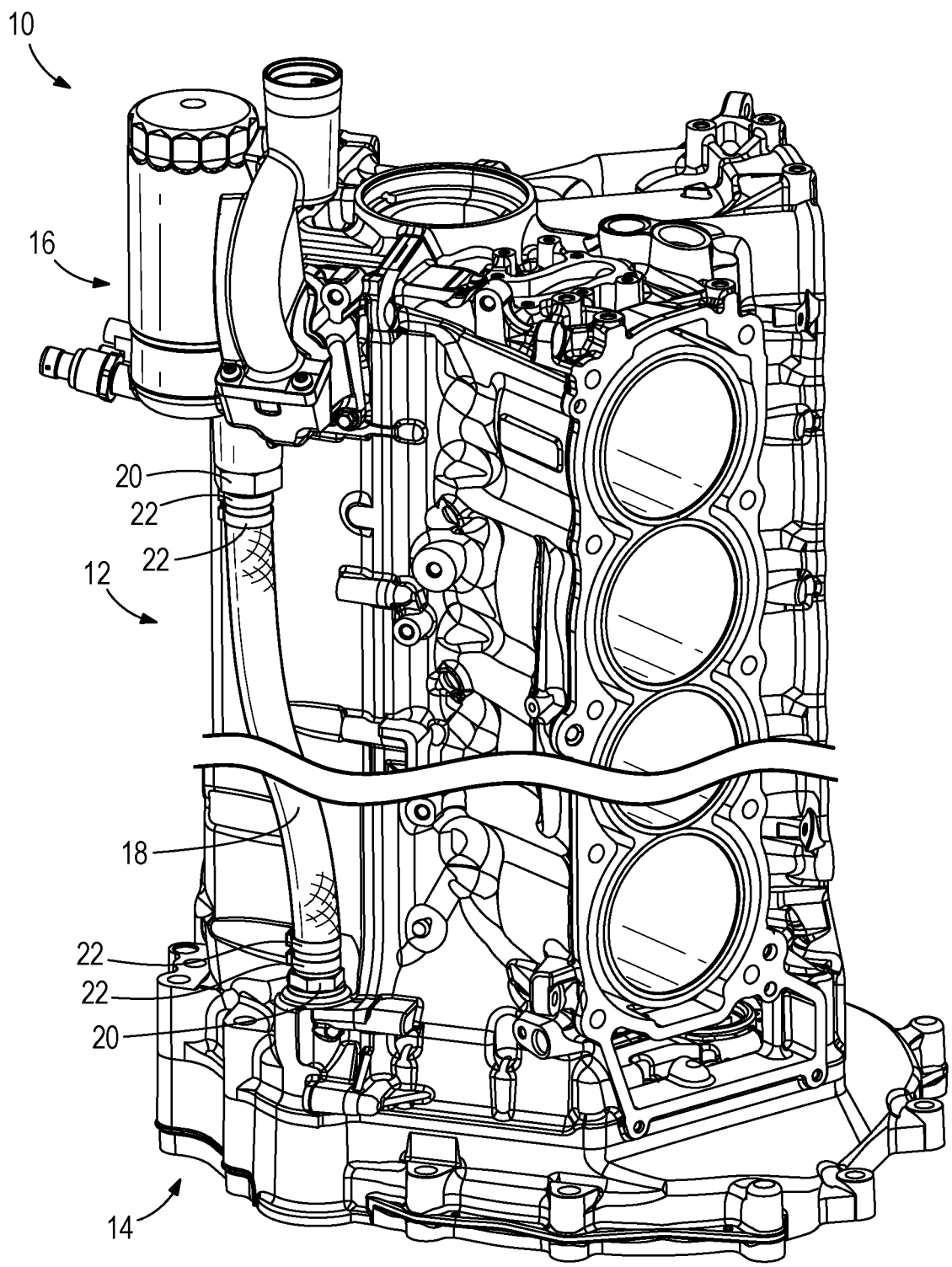
FIG. 1 is a perspective view of the engine of an outboard motor in accordance with the present disclosure.

FIG. 1 depicts a perspective view of an engine 10 that may be utilized in an outboard motor of a marine vehicle, for example, a boat. The engine 10 may include a cylinder block with vertically stacked cylinder banks arranged in a V-shape. The engine 10 further includes a hose assembly 12 that fluidly couples an oil sump 14 to an oil filter 16. The oil sump 14 provides a reservoir for lubricating oil for the engine 10, while the oil filter 16 removes impurities and solid materials from the lubricating oil. Although the embodiments of the hose assembly in the present disclosure will be described exclusively with reference to fluid coupling of an oil sump to an oil filter, nothing in the present disclosure is intended to limit the applications of the hose assembly 12 within a marine environment. For example, a hose assembly according to the present disclosure may be utilized with a remote mount oil pressure sensor, or to fluidly couple various components of the fuel delivery system, for example, a fuel filter and a fuel pump.

Existing hose assemblies generally include many individual parts (e.g., hoses, tubes, metallic fasteners, sleeves, ferrules, metallic crimp collars) that contribute to the cost, weight, and package size of the hose assembly Eliminating one or more of these parts therefore results in a desirable simplification and cost reduction in the bill of materials for the hose assembly, a reduction in the number of leak paths from the hose assembly, and/or a desirable reduction in the space required to install the hose assembly. In addition, the stack up of multiple individual parts in existing hose assemblies may constrain the flow diameter through the hose relative to the size of the threaded connections utilized to couple the hose assembly to engine components. Maximizing the flow diameter through the hose by decreasing the space consumed by separate hose assembly parts permits the hose assembly to more easily achieve system flow requirements.

Hose assembly 12 is shown to include a hose 18 extending from the oil sump 14 to the oil filter 16. A hose fitting 20 is located at each end of the hose 18 proximate both the oil sump 14 and the oil filter 16. The hose fitting 20 connects the hose 18 to each of the oil sump 14 and the oil filter 16 such that lubricating oil is able to flow unimpeded between the oil sump 14 and the oil filter 16. In an exemplary implementation, the hose assembly 12 includes four hose clamps 22 in total, with two hose clamps 22 situated near the oil sump 14 and two hose clamps 22 situated near the oil filter 16. Further details regarding the style of the hose clamps 22 and their locations thereof relative to the hose fittings 20 are included below with reference to FIGS. 4 and 5.

Figure 2:
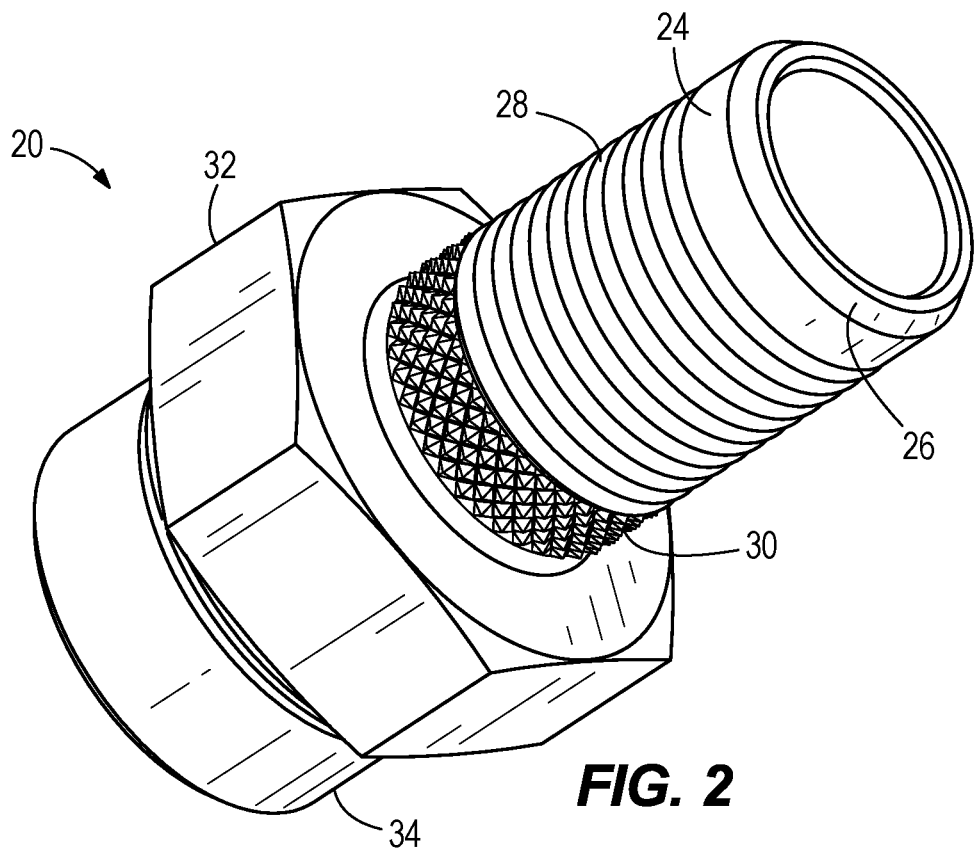
FIG. 2 is a perspective view of a hose fitting shown in a hose assembly of the engine of FIG. 1.
Figure 3:
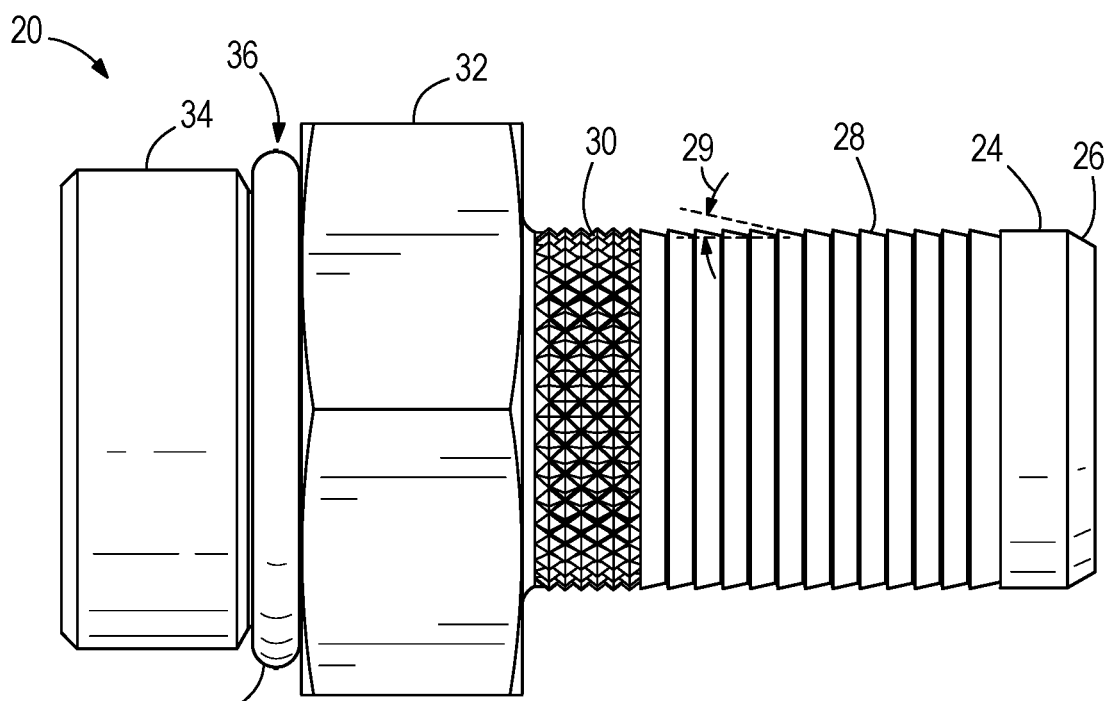
FIG. 3 is a side elevational view of the hose fitting of FIG. 2.

Referring now to FIGS. 2 and 3, perspective and side views of the hose fitting 20 are depicted, according to an exemplary implementation. The hose fitting 20 is shown to include, among other features, a lead-in portion 24, a barbed portion 28, a knurled portion 30, a grip portion 32, and a terminating portion 34. Certain aspects of features 24-34 of the hose fitting 20 may conform to the good design practices of the Society of Automotive Engineers (SAE) Recommended Practice J1697-Recommended Practices for Design and Evaluation of Passenger and Light Truck Coolant Hose Clamped Joints.

Figure 5:
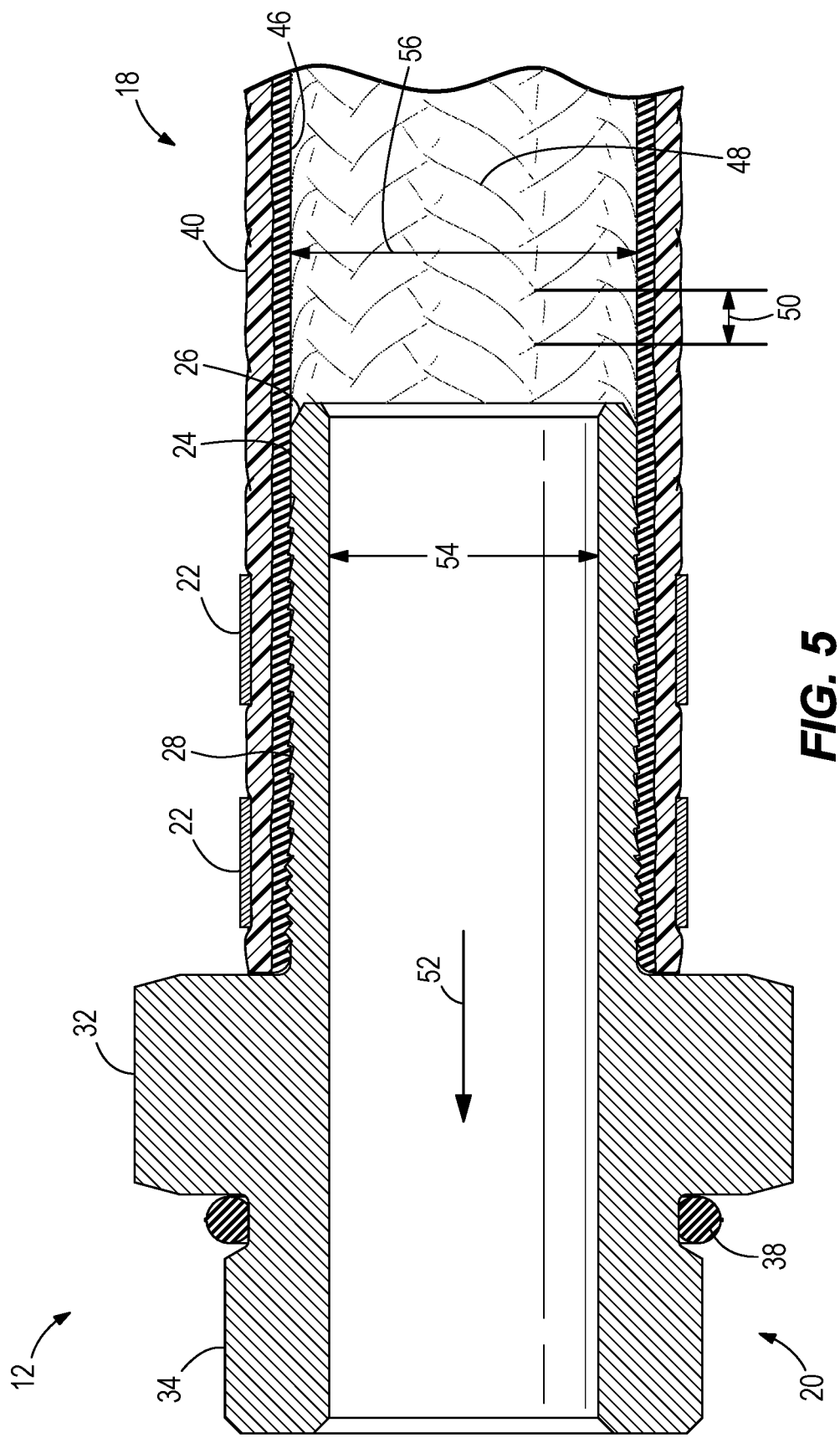
FIG. 5 is a sectional view of the hose assembly taken on line 5-5 of FIG. 4.

The lead-in portion 24 is the first segment of the hose fitting 20 encountered by the hose 18 during an installation process. To aid in the initial insertion of the hose fitting 20 into the hose 18, the lead-in portion 24 includes a smooth exterior surface and may include a chamfered edge 26 that aligns the hose fitting 20 relative to the hose 18. In an exemplary implementation, an amount of interference between the inner liner of the hose 18 (e.g., liner 46 as depicted in FIG. 5) and the lead end diameter of the lead-in portion 24 may range from 0% to 6% of the inner diameter of the hose 18 (depicted as diameter 56 in FIG. 5).

Barbed portion 28 is shown to be coupled to the lead-in portion 24. As particularly depicted in FIGS. 2-4, in an exemplary implementation, the barbed portion 28 includes thirteen barbs. In other implementations, the barbed portion 28 may include a different number of barbs depending on the characteristics of the location in which the hose fitting 20 is installed. For example, the hose fitting 20 may require fewer than thirteen barbs when the hose assembly 12 is installed in a lower pressure application, or an application in which potential leakage of fluid from the hose assembly 12 is of lesser concern. Conversely, the hose fitting 20 may require more than thirteen barbs when the hose assembly 12 is installed in a higher pressure application, or an application in which potential leakage of fluid from the hose assembly 12 is of greater concern. Other installation characteristics that affect the number and design of barbs utilized in the barbed portion 28 include the required installation force, which increases with the number of barbs, the width of the hose clamp 22, and the weave angle of a liner of the hose 18 (e.g., liner 46, depicted in FIG. 5).

Each of the barbs of the barbed portion 28 may form a substantially conical surface that tapers from a smaller first diameter that is located at an end of the fitting 20 proximate the lead-in portion 24 to a larger second diameter that is located at an opposite end of the fitting 20 proximate the knurled portion 30. In an exemplary implementation, the height 29 of each barb may range from 0.30 mm to 0.50 mm. The barb height 29 may be chosen to ensure that the barbed portion 28 is guaranteed to form an interference fit with a liner of the hose 18 (e.g., liner 46, depicted in FIG. 5) when the hose 18 is inserted over the barbed portion 28. In an exemplary implementation, an amount of interference between the inner liner of the hose 18 and the barbed portion 28 may range from 3% to 9% of a nominal wall thickness of the hose liner.

Knurled portion 30 is shown to be coupled to the barbed portion 28. Knurled portion 30 may be provided to inhibit rotation of the hose 18 relative to the fitting 20, as described in further detail below with reference to FIG. 4. The minimum length of the knurled portion 30 is the width of the hose clamp 22. The maximum diameter of the knurled portion 30 may be selected such that it is larger than the lead end diameter of the lead-in portion 24 and smaller than the maximum diameter of the barbed portion 28. Although the present application depicts the knurled portion 30 as having a diamond knurling pattern, in other implementations, the knurled portion 30 could include any desired knurling pattern, including, but not limited to, a straight line pattern, a checkered pattern, a left hand pattern, a right hand pattern, or a combination of patterns.

Grip portion 32 is shown to be coupled to the knurled portion 30. Grip portion 32 includes multiple flat surfaces that are configured to be gripped by a user and/or a tool during installation of the hose assembly 12. For example, in an exemplary implementation, the flat surfaces of the grip portion form a hexagonal shape similar to a hexagonal nut in order to permit a wrench to easily grasp the grip portion 32 and rotate the fitting 20 relative to an engine component (e.g., oil sump 14, oil filter 16).

Still referring to FIGS. 2 and 3, the terminating portion 34 is shown to be coupled to the grip portion 32. The terminating portion 34 may have any characteristics required to detachably couple the hose fitting 20 to an engine component. For example, in some implementations, the terminating portion 34 may include male coupling features (e.g., threads located on an exterior surface) configured to be inserted within female coupling features of the engine component. In other implementations, the terminating portion 34 may include female coupling features (e.g., threads located on an interior surface) configured to receive male coupling features of the engine component. In still further implementations, the terminating portion 34 may couple to the engine component using features other than internal or external threads.

The hose fitting 20 may be fabricated from any material suitable to withstand the rigors of an engine utilized in a marine environment. For example, materials that are stiff and have high temperature resistance are preferable to materials that are compliant and ductile at temperatures over 100° C. The hose fitting 20 must be able to withstand both the internal pressures of the fluid flowing through the hose 18 and the external forces applied to the fitting 20 by the hose clamps 22. In other words, the hose fitting 20 cannot crush when the hose clamps 22 are secured. For example, in an exemplary implementation, the hose fitting 20 is fabricated from a low carbon stainless steel (e.g., 304L stainless steel) which has very low susceptibility to corrosion. In other implementations, the hose fitting 20 may be fabricated from a different steel or brass alloy (e.g., 316 stainless steel, C36000 brass), carbon steel, copper, or a glass and/or mineral-filled polymer.

Referring now specifically to FIG. 3, the hose fitting 20 is further shown to include a radial groove 36 situated between the grip portion 32 and the terminating portion 34. Sealing element 38 may cut off a potential leak path between an engine component (e.g., oil sump 14, oil filter 16) and the terminating portion 34. In an exemplary implementation, sealing element 38 is an o-ring having a circular cross-section. In other implementations, the sealing element 38 may have a different cross-sectional shape, including but not limited to, a square shape, a rectangular shape, an X-shape, or a double X-shape. The sealing element 38 may be fabricated from any material suitable to a marine environment, including, but not limited to, buna-N (nitrile), ethylene-propylene (EPDM), silicone, neoprene, fluorocarbon, or fluorosilicone.

Figure 4:
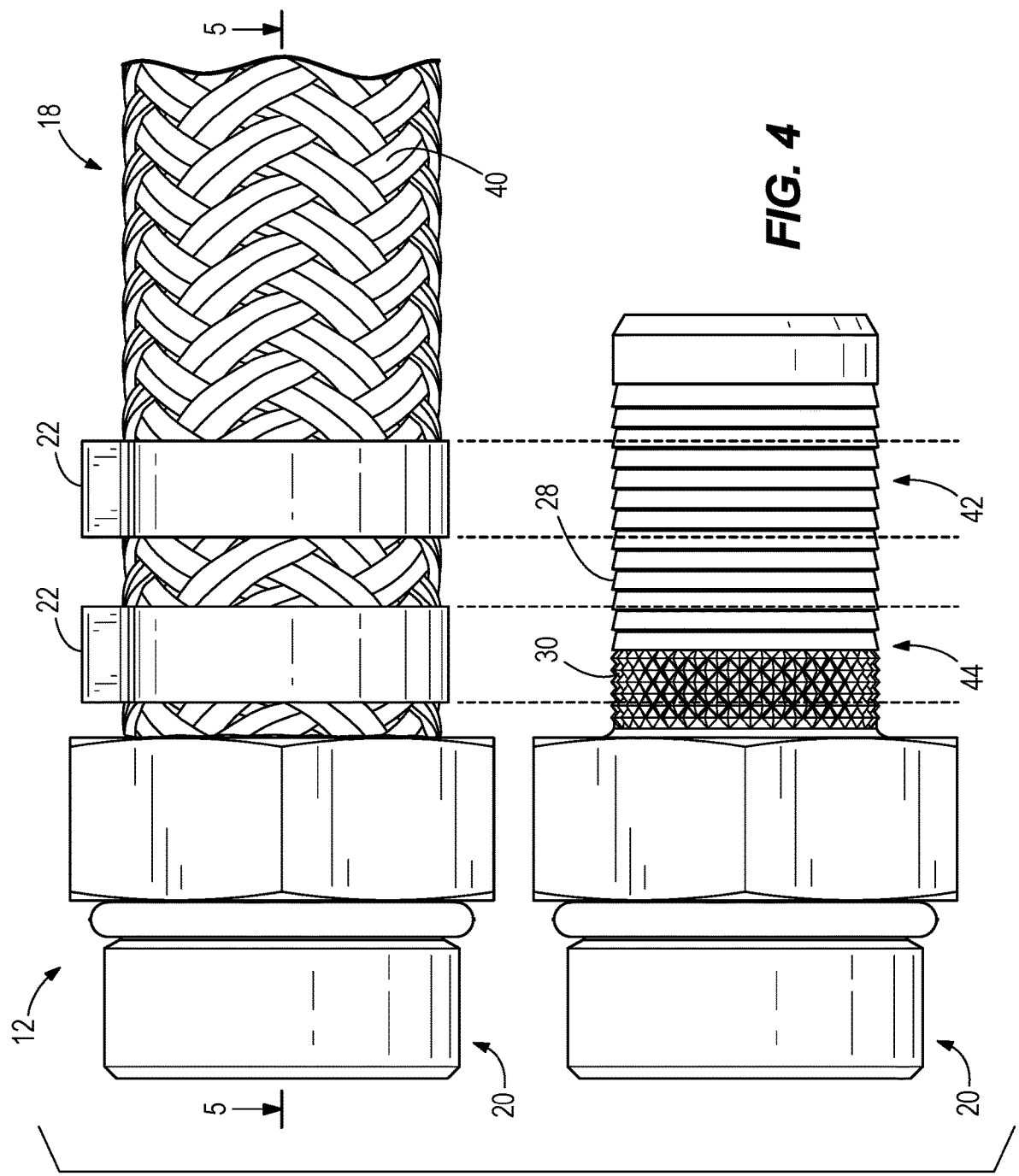
FIG. 4 is a side elevational view depicting the positioning of clamps shown in the hose assembly of FIG. 1.

FIG. 4 depicts both a side detail view of a hose assembly 12 and an isolated hose fitting 20. The first hose clamp 22 is shown to be located on the hose assembly 12 such that it spans a region 42 of the barbed portion 28 on hose fitting 20 and inhibits the formation of a leak path between the hose 18 and the fitting 20. The second hose clamp 22 is shown to be located on the hose assembly 12 such that it spans a region 44 of both the barbed portion 28 and the knurled portion 30. By spanning the barbed portion 28 and the knurled portion 30, the second hose clamp 22 both inhibits the formation of a leak path between the hose 18 and the fitting 20 and prevents rotation of the hose 18 relative to the fitting 20 due to frictional contact between the multifaceted knurled portion 30 and the liner of the hose 18.

In an exemplary implementation, each hose clamp 22 is an ear clamp manufactured by Oetiker. To install the ear hose clamps 22 and secure the hose 18 to the hose fitting 20, a user first positions the hose clamps 22 over an overbraid 40 of the hose 18 prior to inserting hose 18 over the hose fitting 20. The user then moves the hose 18 successively over the lead-in portion 24, the barbed portion 28, and the knurled portion 30 until the hose 18 is flush against the grip portion 32. Once the hose 18 has been properly located relative to the hose fitting 20, the user can slide the hose clamps 22 so that they are positioned over regions 42 and 44 spanning the barbed portion 28 and the knurled portion 30. A user then utilizes a tool (e.g., a jaw pincher, pliers) to compress a clamp ear of each hose clamp 22 and secure the position of each hose clamp 22 relative to the hose 18 and hose fitting 20. In other implementations, a different style of clamp may be utilized for the hose clamps 22, including, but not limited to, a worm drive clamp, a bolt clamp, a pinch clamp, a quick release clamp, a spring clamp, a snap grip clamp, a band and buckle clamp, and a shrink fit clamp.

Referring now to FIG. 5, a side cross-sectional view of the hose assembly 12 is depicted. The overbraid 40 of the hose 18 is shown to be coupled to an inner liner 46. In an exemplary implementation, the liner 46 is fabricated from polytetrafluoroethylene (PTFE), commonly known as Teflon, and the overbraid 40 is fabricated from PTFE-impregnated aramid fibers. Teflon-lined hose assemblies are particularly desirable for marine applications because they may be utilized across a wide range of operating temperatures, they have excellent chemical and corrosion resistance, and they have a low coefficient of friction that minimizes pressure drops of fluid flowing through the hose assembly.

The liner 46 is shown to be formed with a repeating weave pattern 48. In an exemplary implementation, the depth of the weave pattern 48 may extend in a range from 0.11 mm to 0.25 mm below a nominal surface of the liner 46. As described above, each of the barbs of the barbed portion 28 may be designed to guarantee an interference fit between the barbed portion 28 and the liner 46. For example, each barb may extend in a range from 0.30 mm to 0.50 mm below a nominal surface of the liner 46, meaning that even if the weave pattern 48 is at the maximum depth of 0.25 mm, and the barb is at a minimum depth of 0.30 mm, a 0.05 mm interference region is formed between the barbed portion 28 of the fitting 20 and the liner 46 of the hose 18.

Still referring to FIG. 5, in an exemplary implementation, each of the hose clamps 22 has a width of 10 mm. In other words, each of the regions 42 and 44 depicted in FIG. 4 is nominally 10 mm wide. In this way, each of the hose clamps 22 spans more than one repetition of weave pattern 48, minimizing the formation of leak paths along the weave pattern 48. The hoop stress of the hose clamps 22 causes the liner 46 to creep or flow into the barbed portion 28 without causing creep of the hose fitting 20. Thus, the hose clamps 22 maintain a reliable seal between the hose fitting 20 and the liner 46 of the hose 18.

The features of the hose fitting 20, including the lead-in portion 24, the barbed portion 28, the grip portion 32, and the terminating portion 34, collectively define a central flow passage 52 that extends through the fitting 20. As described above, a diameter 54 of the central flow passage 52 may be as close to a diameter 56 of the hose liner 46 as possible in order to maximize the internal flow area and ensure that required system flow requirements are achieved. For example, in an exemplary implementation, the diameter 54 of the central flow passage 52 ranges from 82%-84% of the diameter 56 of the hose liner 46.

Figure 6:
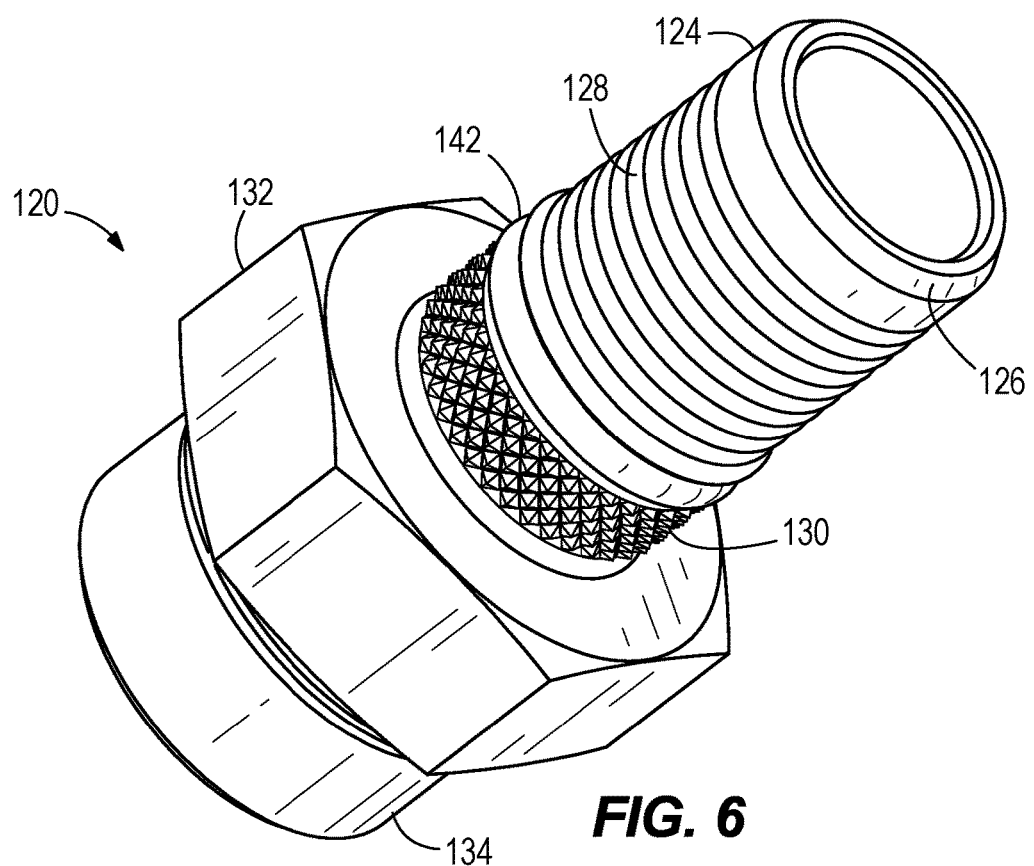
FIG. 6 is a perspective view of another embodiment of a hose fitting that can be utilized in the hose assembly of FIG. 1.
Figure 7:
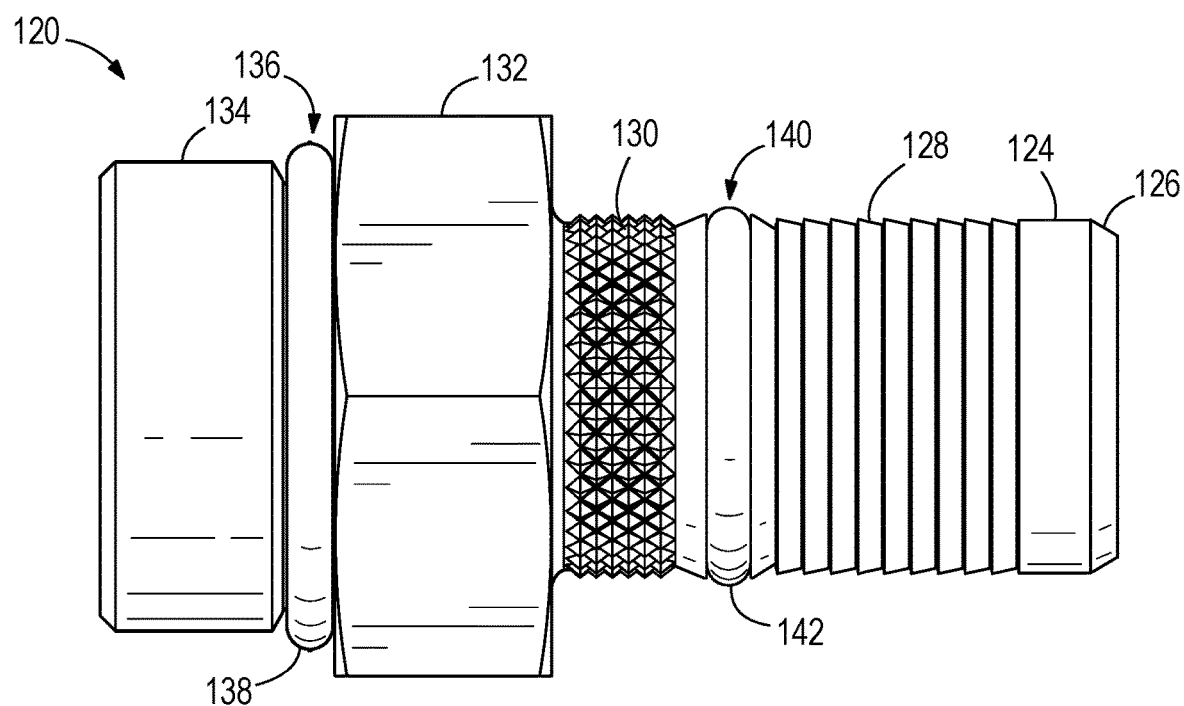
FIG. 7 is a side elevational view of the hose fitting of FIG. 6.

FIGS. 6 and 7 depict another example embodiment of a hose fitting 120. In contrast to the hose fitting 20 depicted in FIGS. 1-5, the hose fitting 120 is shown to include an additional sealing groove 140 with a sealing element 142 positioned therein. Other features of the hose fitting 120, including the lead-in portion 124 with chamfered edge 126, the barbed portion 128, the knurled portion 130, the grip portion 132, the terminating portion 134, and the sealing element 138 positioned in groove 136 are all identical or substantially similar to counterpart features of hose fitting 20 described above with reference to FIGS. 1-5. Hose fitting 120 may be utilized in applications in which preventing fluid leakage is of particular concern. Sealing element 142 may be substantially similar to sealing elements 38 and 138 in terms of material and cross-sectional shape (e.g., the cross-sectional shape of sealing element 142 may be a square shape, a rectangular shape, an X-shape, or a double X-shape). In one implementation, sealing element 142 is a −115 size o-ring per the requirements of Aerospace Standard (AS) 568.

Hose fitting 120, like hose fitting 20, may be secured to the hose 18 using two hose clamps 22. The first hose clamp 22 may be positioned over the barbed portion 128, between the sealing groove 140 and the lead-in portion 124. The second hose clamp 22 may be positioned over the knurled portion 130, closer to the grip portion 132 when compared with the region 44 spanned by second hose clamp 22 depicted in FIG. 4.

In the present disclosure, certain terms have been used for brevity, clearness and understanding. No unnecessary limitations are to be implied therefrom beyond the requirement of the prior art because such terms are used for descriptive purposes only and are intended to be broadly construed. The different systems and methods described herein may be used alone or in combination with other systems and devices. Various equivalents, alternatives and modifications are possible within the scope of the appended claims.

What is claimed is:

1. A hose assembly configured to fluidly couple an oil pump to an oil filter in a boat engine, the hose assembly comprising:
   a hose extending from a first end to a second end, the hose comprising an inner liner fabricated from woven PTFE and having a repetitive weave pattern;
   a first hose fitting situated at the first end and a second hose fitting situated at the second end; each hose fitting comprising:
   a lead in portion having a substantially smooth exterior surface;
   a barbed portion comprising a plurality of barbs configured to sealingly engage with the inner liner of the hose;
   a grip portion comprising a plurality of substantially flat grip faces; and
   a terminating portion configured to couple to the oil pump or the oil filter;
   wherein the lead in portion, the barbed portion, the grip portion, and the terminating portion collectively define a central flow passage extending through each hose fitting; and
   wherein each hose fitting is coupled to the hose with a first clamp and a second clamp such that each of the first clamp and the second clamp spans more than one repetition of the repetitive weave pattern.

2. The hose assembly of claim 1, wherein the first clamp is situated over a section of the barbed portion of the hose fitting.

3. The hose assembly of claim 1, wherein each hose fitting further comprises a knurled portion situated between the barbed portion and the grip portion, the knurled portion configured to inhibit rotation of the hose relative to each hose fitting.

4. The hose assembly of claim 3, wherein the second clamp is situated over both a section of the barbed portion and a section of the knurled portion of the hose fitting.

5. The hose assembly of claim 1, wherein each hose fitting further comprises a radial sealing groove formed between the barbed portion and the grip portion.

6. The hose assembly of claim 5, wherein an o-ring is located between the inner liner of the hose and the radial sealing groove of each hose fitting.

7. A method of assembling a hose assembly used to fluidly couple an oil pump to an oil filter in a boat engine, the method comprising:
   providing a hose extending from a first end to a second end, the hose comprising an inner liner that is coupled to an overbraid and has a repetitive weave pattern;
   positioning a first hose clamp and a second hose clamp over the overbraid such that each of the first clamp and the second clamp spans more than one repetition of the repetitive weave pattern of the inner liner;
   inserting a hose fitting into the first end of the hose, the hose fitting comprising:
   a lead-in portion having a substantially smooth exterior surface;
   a barbed portion comprising a plurality of barbs configured to sealingly engage with the inner liner of the hose;
   a knurled portion configured to inhibit rotation of the hose relative to the hose fitting;
   a grip portion comprising a plurality of substantially flat grip faces; and
   a terminating portion configured to couple to the oil pump or the oil filter;
   securing the first hose clamp such that the first hose clamp spans a first section of the hose fitting comprising the barbed portion; and
   securing the second hose clamp such that the second hose clamp spans a second section of the hose fitting comprising the barbed portion and the knurled portion.

8. The method of claim 7, wherein each of the first hose clamp and the second hose clamp comprise clamp ears, and wherein securing the first hose clamp and the second hose clamp comprises compressing the clamp ears.

9. The method of claim 7, wherein inserting the hose fitting into the first end of the hose comprises moving the hose successively over the lead-in portion, the barbed portion, and the knurled portion until the hose is flush against the grip portion.

* * * * *